UNITED STATES PATENT OFFICE.

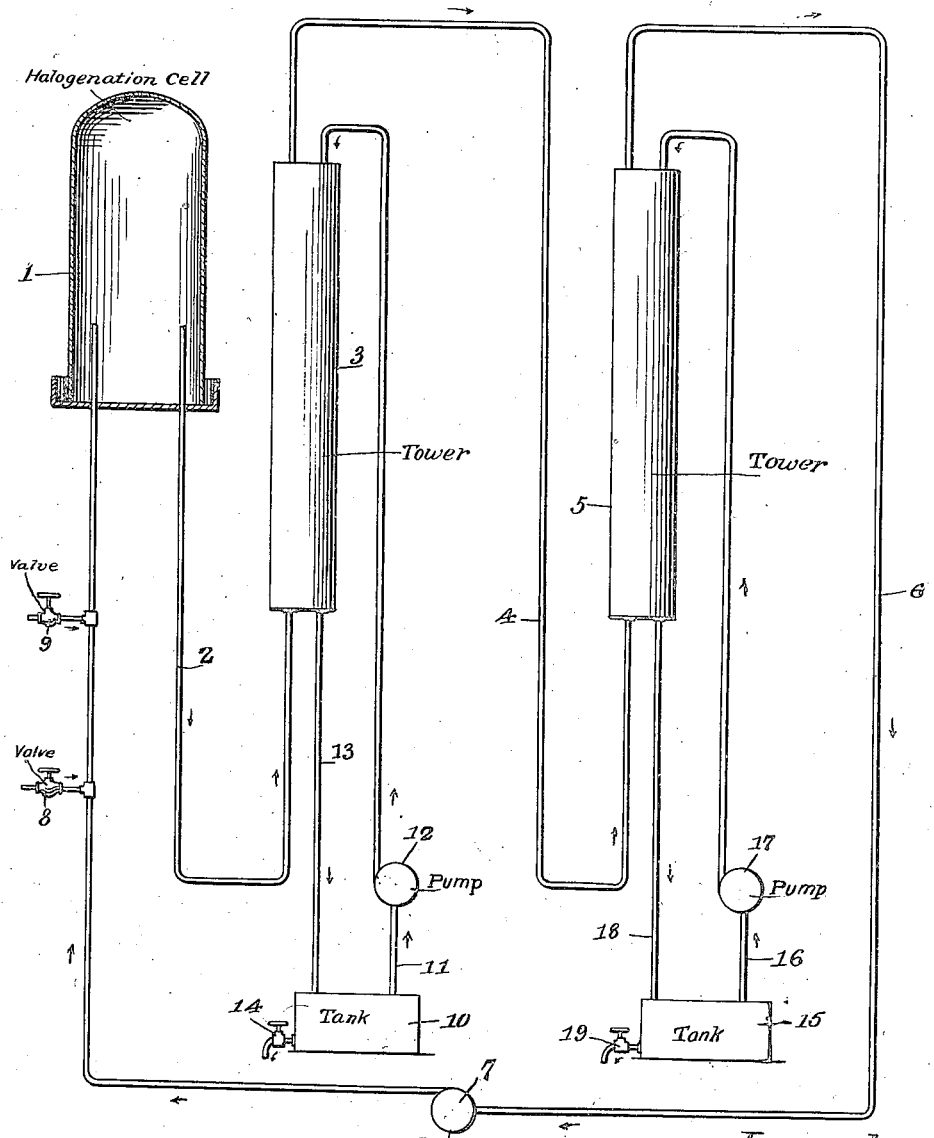

WALTER O. SNELLING, OF ALLENTOWN, PENNSYLVANIA.

PREPARATION OF HALOGEN COMPOUNDS.

1,421,733.
Specification of Letters Patent.
Patented July 4, 1922.

Application filed June 4, 1920. Serial No. 386,627.

*To all whom it may concern:*

Be it known that I, WALTER O. SNELLING, a citizen of the United States, residing at Allentown, in the county of Lehigh and State of Pennsylvania, have invented certain Improvements in the Preparation of Halogen Compounds, of which the following is a specification.

My invention relates to the preparation of halogen compounds, and more particularly to the preparation of chlorinated products of hydrocarbons.

When a gaseous hydrocarbon such as methane or ethane is brought into contact with a gaseous halogen such as chlorine or bromine under the influence of actinic rays, or equivalent agent capable of promoting combination between the hydrocarbon and the halogen, there is a strong tendency toward the substitution of more than one halogen atom in each molecule of the hydrocarbon. While this is highly advantageous where the preparation of di-halogenated or poly-halogenated compounds is desired, yet it forms a marked cause of loss of halogen and hydrocarbon where mono-halogenated compounds are mainly desired. It has long been recognized that the amount of di- and poly-halogenated compounds produced could be materially reduced by using a great excess of hydrocarbon as compared with the amount of halogen present, but in previous efforts along this line the removal of the small amounts of mono-halogenated compound produced in the halogenating operation from the large excess of hydrocarbon present has been attended with such difficulties as to make the operation uneconomical from a commercial standpoint, and the products obtained have had reduced value because of the presence of objectionable impurities.

One purpose of my present invention is the separation of halogenated hydrocarbons from their admixture with unhalogenated hydrocarbons, without the use of refrigerating apparatus, and without the employment of the very low temperatures which have hitherto been found necessary in order to make the required separation, and the obtaining of halogenated hydrocarbons and hydrogen halides of a high degree of purity.

I have discovered that by cyclicly contacting the gaseous halogenated hydrocarbon, unhalogenated hydrocarbon and hydrogen halide which results from the treatment of a gaseous hydrocarbon with a halogen in any of the usual types of halogenating cells, with a liquid menstruum which is a good solvent for a halogenated hydrocarbon, but which is a poor solvent for the unhalogenated hydrocarbon, and then treating the remaining gaseous fluid with a liquid menstruum which is a good solvent for hydrogen halide, but which is a poor solvent for an unhalogenated hydrocarbon, I am able to obtain in an economical way the separation of the halogenated compounds desired from the excess of unhalogenated hydrocarbons, so that the hydrocarbon can be recirculated and utilized, and I obtain the hydrogen halide in very pure condition.

In the attached drawing I have shown one form of apparatus suitable for use in connection with my present invention. In the cell 1, the reaction between a gaseous hydrocarbon and a gaseous halogen is brought about. Such halogenation cells as those described in my U. S. Patents 1,271,790, 1,285,823 and 1,325,214 and my pending applications, S. N. 132,869, filed November 22, 1916; 151,793, filed March 1, 1917; 152,588, filed March 6, 1917; 152,589, filed March 6, 1917; and 153,428 filed March 8, 1917, are suitable for this purpose, or I may employ any other suitable form of halogenating unit. A pipe 2 conducts the vaporous products from the reaction vessel 1 to tower 3, and a pipe 4 conducts the residual vaporous products from tower 3 to tower 5. A pipe 6 conducts the residual gaseous or vaporous products from tower 5 back to the halogenating cell 1, the circulation of these gaseous or vaporous products being brought about by a pump 7, or by other convenient means. The system as described offers a means for continuously circulating a gaseous fluid through the reaction vessel and the two towers. The tank 10 is preferably arranged at a lower level than tower 3, and contains a liquid which is a good solvent for the halogenated compound desired, but which is a relatively poor solvent for the unhalogenated hydrocarbon. The pipe 11 leads from this tank to the top of tower 3, and the pump 12 raises the liquid from tank 10 to the top of tower 3. Tank 15 is preferably arranged at a lower level than tower 5, and contains a liquid which is a good solvent for a hydrogen halide, but which is a relatively poor solvent for the unhalogenated hydrocarbon. Pipe 16 leads from this tank to the top of tower 5, and pump 17 raises the liquid from tank 15 to the top of tower 5. This pipe 18 connects the bottom of tower 5 with tank 15, for the purpose of conducting the liquid raised by pump 17 back to tank 15.

The valves 8 and 9 are attached to pipe 6 for the purpose of admitting gaseous halogen and gaseous hydrocarbon respectively. Valve 14 is attached to tank 10 for the purpose of allowing its contents to be withdrawn for further treatment, and 19 is a valve attached to tank 15 for the purpose of permitting its contents to be withdrawn in a similar way.

In the operation of the device as described, cell 1, pipes 2, 4 and 6, and towers 3 and 5 are first preferably filled with a hydrocarbon gas through valve 9. Tank 10 is filled with a material such as lubricating oil, carbon tetrachloride, or other like material having greatly superior solvent action for halogenated hydrocarbon than for gaseous unhalogenated hydrocarbons. Tank 15 is filled with water or other liquid possessing greatly superior solvent action for hydrogen halides than for unhalogenated hydrocarbons.

By means of the pump 7 the methane or other gaseous hydrocarbon is caused to continuously circulate from reaction vessel 1 through towers 3 and 5 and back to reaction vessel 1. By means of pump 12 the liquid from tank 10 is caused to continuously circulate through tower 3 and back to tank 10. By means of pump 17 the liquid from tank 15 is caused to continuously circulate through tower 5 and back to tank 15.

If now a small amount of a gaseous halogen such as chlorine is introduced through valve 8, this will be carried by the circulating hydrocarbon gas into the reaction vessel 1, where reaction between the halogen and the hydrocarbon will be brought about. This reaction will result in the formation of a halogenated hydrocarbon and hydrochloric acid gas. As it is preferable to have the hydrocarbon to be halogenated present in very great excess, and the intensity of the reaction in vessel 1 controlled so as to permit of only a very mild substituting action, the gaseous and vaporous products which will pass out of reaction vessel 1 through tube 2 will consist mainly of unhalogenated methane with smaller amounts of hydrochloric acid gas and methyl chloride.

In tower 3 these gaseous and vaporous products will be contacted with the liquid from tank 10. As this liquid has greatly superior solvent power for the halogenated hydrocarbon than it has for the unhalogenated hydrocarbon, it will exert selective absorption, and will tend to saturate itself with the halogenated hydrocarbon. The residual gaseous and vaporous products passing out from the top of tower 3 through pipe 4 will consist mainly of unhalogenated hydrocarbon with a smaller amount of admixed hydrochloric acid gas. In tower 5 these products will be contacted with the liquid from tank 15, and as this liquid has superior solvent power for hydrochloric acid gas than it has for the unhalogenated hydrocarbon, this material will be mainly removed, and only the unhalogenated hydrocarbon will pass out from the top of tower 5, to be sent back to reaction vessel 1. By the continual admission through valves 8 and 9 of amounts of halogen and hydrocarbon corresponding to the amounts of hydrochloric acid gas and halogenated hydrocarbon removed in towers 5 and 3 the composition of the circulating gases and vapors is maintained substantially constant. Liquid from tank 10 is continuously or intermittently drawn off through valve 14, and treated by distillation or other means to remove the dissolved halogenated hydrocarbon present, the solvent being replaced in the tank, and similarly, liquid from tank 15 is continuously or intermittently drawn off through valve 19, and may be treated to recover the hydrochloric acid gas or may be discarded, in either case additional solvent being replaced to compensate for the amount drawn off.

It will be noted that by the apparatus as described the use of low temperatures or of refrigerating apparatus is completely avoided, and halogenated hydrocarbon may be continuously and cheaply produced from gaseous halogens and gaseous hydrocarbons. I find it of great advantage to remove the halogenated hydrocarbon produced in the reaction in cell 1 before removing the hydrochloric acid gas, since in this way I obtain a much purer product in the step of removing the hydrochloric acid gas, and the hydrochloric acid gas so obtained is free from the traces of volatile halogenated hydrocarbons which materially lowers the commercial value of the hydrochloric acid usually produced in halogenating reactions.

Although I have particularly described the application of my invention to the preparation of methyl chloride, it will be understood that the same principle is broadly applicable to the production of other hydrocarbon halides, and in place of methane I may use ethane, butane or other hydrocarbons, and in place of chlorine I may use bromine. By operating my entire apparatus at a slightly elevated temperature I am able to apply the general principles of my reaction even to hydrocarbons and halogens which are liquid at normal temperatures, and by operating at somewhat above normal room temperatures such hydrocarbons as propane may be successfully used, and halogens such as bromine may be employed. While I have particularly described the use of such forms of halogenating apparatus as are referred to in U. S. Patents 1,271,790, 1,285,823 and 1,325,214 and my pending applications S. N. 132,869, 151,793, 152,588, 152,589 and 153,428, it will be understood that I may employ any other suitable form of halogenating apparatus which is capable of bringing about the desired reaction between a hydrocarbon and a halogen under such conditions as are capable of control without the reaction speeding up to explosive violence.

I claim:

1. As a step in the treatment of a mixture comprising chlorine, a chlorinated hydrocarbor and hydrochloric acid, the process which comprises removing the chlorinated hydrocarbon by means of a solvent, and thereafter obtaining the hydrochloric acid by treatment with another solvent.

2. As a step in the treatment of a mixture comprising chlorine, methyl chloride and hydrochloric acid, the process which comprises removing the methyl chloride by means of a solvent, and thereafter dissolving the hydrochloric acid in another solvent.

3. In the preparation of hydrochloric acid, the process which comprises chlorinating methane with the production of methyl chloride and hydrochloric acid; contacting the resulting gaseous mixture with a solvent for methyl chloride, and thereafter contacting the residual gaseous product with a solvent for hydrochloric acid gas.

4. As a step in the treatment of the reaction products resulting from the chlorination of methane, the process which comprises contacting such reaction products with a body which is a better solvent for methyl chloride than for hydrochloric acid, and thereafter contacting the remaining gases with a body which is a better solvent for hydrochloric acid than for methane.

In testimony whereof, I have hereunto subscribed my name this 12th day of April, 1920.

WALTER O. SNELLING.